United States Patent
Kim et al.

(10) Patent No.: US 9,231,416 B2
(45) Date of Patent: Jan. 5, 2016

(54) APPARATUS AND METHOD FOR DETECTING FAILURE OF BATTERY

(75) Inventors: Duk-Jung Kim, Yongin-si (KR); Jae-Ik Kwon, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 765 days.

(21) Appl. No.: 13/443,838

(22) Filed: Apr. 10, 2012

(65) Prior Publication Data
US 2013/0093383 A1     Apr. 18, 2013

(30) Foreign Application Priority Data

Oct. 14, 2011   (KR) ................. 10-2011-0105430

(51) Int. Cl.
| | | |
|---|---|---|
| H02J 7/04 | (2006.01) | |
| H02J 7/16 | (2006.01) | |
| H02J 7/00 | (2006.01) | |
| H01M 10/42 | (2006.01) | |
| H01M 10/44 | (2006.01) | |
| H01M 10/48 | (2006.01) | |

(52) U.S. Cl.
CPC ........... *H02J 7/0026* (2013.01); *H01M 10/425* (2013.01); *H01M 10/441* (2013.01); *H01M 10/482* (2013.01); *H01M 10/486* (2013.01); *H02J 7/009* (2013.01); *H01M 2010/4271* (2013.01); *H01M 2010/4278* (2013.01)

(58) Field of Classification Search
CPC .............................. H02J 7/009; H01M 10/445
USPC .................................................. 320/147, 150
See application file for complete search history.

(56) References Cited

U.S. PATENT DOCUMENTS

| | | | | |
|---|---|---|---|---|
| 6,294,282 | B1* | 9/2001 | Misra et al. ................... | 429/54 |
| 6,437,542 | B1* | 8/2002 | Liaw et al. ................... | 320/147 |
| 2008/0090134 | A1* | 4/2008 | Berg .............................. | 429/50 |
| 2009/0053586 | A1* | 2/2009 | Fredriksson et al. ......... | 429/57 |
| 2012/0169296 | A1* | 7/2012 | Lukso et al. .................. | 320/147 |

FOREIGN PATENT DOCUMENTS

| | | |
|---|---|---|
| JP | 2000-123887 | 4/2000 |
| KR | 10-2009-0120268 | 11/2009 |
| KR | 10-2010-0060329 | 6/2010 |

OTHER PUBLICATIONS

English machine translation of JP 2000-123887, published Apr. 28, 2000, 7 pages.

* cited by examiner

*Primary Examiner* — Richard Isla Rodas
*Assistant Examiner* — David V Henze-Gongola
(74) *Attorney, Agent, or Firm* — Christie, Parker & Hale, LLP

(57) ABSTRACT

An apparatus for detecting a failure of a battery includes a plurality of cell internal pressure sensors each provided in a corresponding one of a plurality of battery cells to measure internal pressure of the battery cells and generate and transmit pressure signals, a sensing unit for receiving the pressure signals to sense the internal pressure of the battery cells, a control logic unit for receiving the internal pressure data of each of the battery cells and determining a battery cell having cell internal pressure outside of a predetermined normal range of internal pressure of the battery cell as a failed cell, and a battery control unit for controlling charging or discharging of the other battery cells of the battery except for the failed cell while the failed cell is being repaired or replaced.

14 Claims, 6 Drawing Sheets

APPARATUS AND METHOD FOR DETECTING FAILURE OF BATTERY

CROSS-REFERENCE TO RELATED APPLICATION

This application claims priority to and the benefit of Korean Patent Application No. 10-2011-0105430 filed in the Korean Intellectual Property Office on Oct. 14, 2011, the entire content of which is incorporated herein by reference.

BACKGROUND

1. Field

The present invention relates to an apparatus and a method for detecting a failure of a battery, and more particularly, to an apparatus and a method for detecting mechanical defects of individual cells in a battery pack.

2. Description of Related Art

The foreseeable exhaustion of energy resources and resultant imbalance between supply and demand of energy have increased an interest in new renewable energy and green energy all over the world and endeavor to seek ways of conserving or saving energy. The EU and the United States plan to implement measures to increase the proportion of new renewable energy usage and mandatorily assign the use of new renewable energy. However, under the circumstances where the available renewable energy currently accounts for less than 5% of all energy resources, development of the energy resources should go with a study on the technology to effectively use energy by controlling storage and supply of the produced energy.

An energy supply device may be used in a vehicle driven by electrical energy, but recently, is applied to a self electric generator system in addition to the automotive field, such that applications of the energy supply device as an individual power supply source are being expanded.

The energy supply device may use a lithium ion battery that can be charged and discharged at any time, and particularly, the energy supply device using the lithium ion battery has a disadvantage in that a reaction of chemical compounds in a battery may be caused in an abnormal state, that is, a charge error, an excessive charged or discharged state, or a state showing an indicator used to measure a battery state having an above-normal level, and gas generated by the reaction may cause an explosion or a failure.

Therefore, it is desirable to develop a system and a method capable of rapidly detecting a failure or an abnormal sign of the energy supply device to notify a user of the detected result, and safely supplying energy by escaping from a dangerous environment through immediate repairing.

The above information disclosed in this Background section is only for enhancement of understanding of the background of the invention, and therefore it may contain information that does not form the prior art that is already known in this country to a person of ordinary skill in the art.

SUMMARY

Embodiments of the present invention have been made in an effort to provide an apparatus for detecting a failure of a battery to safely and reliably maintain and manage an energy supply device by early detecting and repairing a failure or an abnormal sign of the battery.

Further, embodiments of the present invention have been made in an effort to provide a method for detecting a failure of a battery having features of rapidly detecting a failure or an abnormal state of an energy supply device which is being operated.

The present invention is not limited to the above-described technical objects, but other technical objects and aspects will be clearly understood by those skilled in the art by the description of the present invention.

An exemplary embodiment of the present invention provides an apparatus for detecting a failure of a battery, including: a plurality of cell internal pressure sensors respectively provided in each of a plurality of battery cells included in a battery, and configured to measure internal pressure of each of the plurality of battery cells and generate and transmit pressure signals including internal pressure data corresponding to the measured internal pressure; a sensing unit configured to receive the pressure signals from the plurality of cell internal pressure sensors to sense the internal pressure of each of the plurality of battery cells; a control logic unit configured to receive the internal pressure data of each of the plurality of battery cells sensed by the sensing unit and determine a battery cell from among the plurality of battery cells having cell internal pressure outside of a normal range of the internal pressure of the battery cells as a failed cell; a battery control unit configured to control charging or discharging of the other battery cells from among the battery cells of the battery except for the failed cell while the failed cell is being repaired or replaced; and a power control unit configured to assist in supplying power to an external system coupled to the battery in response to the determination of the failed cell by the control logic unit.

In this case, the control logic unit may be configured to generate patterns of normal states for the internal pressure of the battery cells corresponding to a charging or discharging period of the battery cells of the battery in advance, and set a normal range of the internal pressure of the battery cells.

When the internal pressure is decreased below a lower limit of the normal range of the internal pressure of the battery cells, the control logic unit may be configured to determine a corresponding battery cell from among the plurality of battery cells having the internal pressure below the lower limit of the normal range as the failed cell having a defect (e.g., mechanical defect).

When the internal pressure is increased above an upper limit of the normal range of the internal pressure of the battery cells, the control logic unit may be configured to determine a corresponding battery cell from among the plurality of battery cells having the internal pressure above the upper limit of the normal range as an overcharged cell.

Further, the cell internal pressure sensor may be configured to measure the internal pressure of each of the plurality of battery cells in real time or intermittently.

The cell internal pressure sensor may be one selected from the group consisting of a piezoelectric sensor, a capacitive pressure sensor, and a strain gauge, but is not limited thereto.

The sensing unit may be further configured to sense information on one or more battery failure determining factors of a cell temperature of each of the plurality of battery cells of the battery, a battery ambient temperature, humidity, a charging amount, a cell voltage, a charging and discharging current, and a battery pack voltage.

According to an exemplary embodiment of the present invention, the apparatus for detecting a failure of a battery may further include a storage unit coupled with the control logic unit and configured to store internal pressure data of each of the plurality of battery cells, patterns of normal states for the internal pressure of the battery cells corresponding to a charging or discharging period of the battery, a set value of the normal range of the internal pressure of the battery cells, information on a battery failure determining factor which is further sensed by the sensing unit, and information on a current state of charge (SOC) or state of health (SOH) of the battery.

Further, the apparatus for detecting a failure of a battery may further include a communication unit coupled to the battery control unit and the power control unit and configured to perform internal communication within the apparatus for detecting a failure of the battery or perform internal communication between the apparatus for detecting a failure of the battery and an external system coupled to the battery.

Another exemplary embodiment of the present invention provides a method for detecting a failure of a battery, including: generating battery cell internal pressure patterns of normal states by measuring internal pressure of a plurality of battery cells included in the battery for a period of time when the battery is being normally charged and discharged; setting a normal range of the internal pressure of the battery cells according to the battery cell internal pressure patterns of the normal states; providing a cell internal pressure sensor for measuring internal pressure at each of the plurality of battery cells and receiving a pressure signal including internal pressure information of each of the plurality of battery cells from the cell internal pressure sensor; acquiring the internal pressure data of each of the plurality of battery cells from the pressure signal to compare the internal pressure data with a battery cell internal pressure pattern of the normal state, and determine whether the internal pressure is out of the normal range of the internal pressure of the battery cell; and determining a corresponding battery cell from among the plurality of battery cells of which the internal pressure is out of the normal range of the internal pressure of the battery cell as a failed cell, and repairing or replacing the failed cell.

The method for detecting a failure of a battery may further include controlling charging or discharging of the other battery cells of the battery except for the failed cell while the failed cell is repaired or replaced.

According to the exemplary embodiments of the present invention, it is possible to safely and reliably maintain, use, and manage an energy supply device by rapidly detecting a failure or an abnormal sign of a battery cell in the energy supply device to notify a user of the detected result and promptly repair the failed cell.

Further, it is possible to secure stability of the energy supply device by applying the apparatus and method for detecting a failure of a battery according to the exemplary embodiments of the present invention, thereby escaping from the dangerous environment such as a failure or an explosion to safely supply energy.

DETAILED DESCRIPTION OF THE EMBODIMENTS

Figure 1:
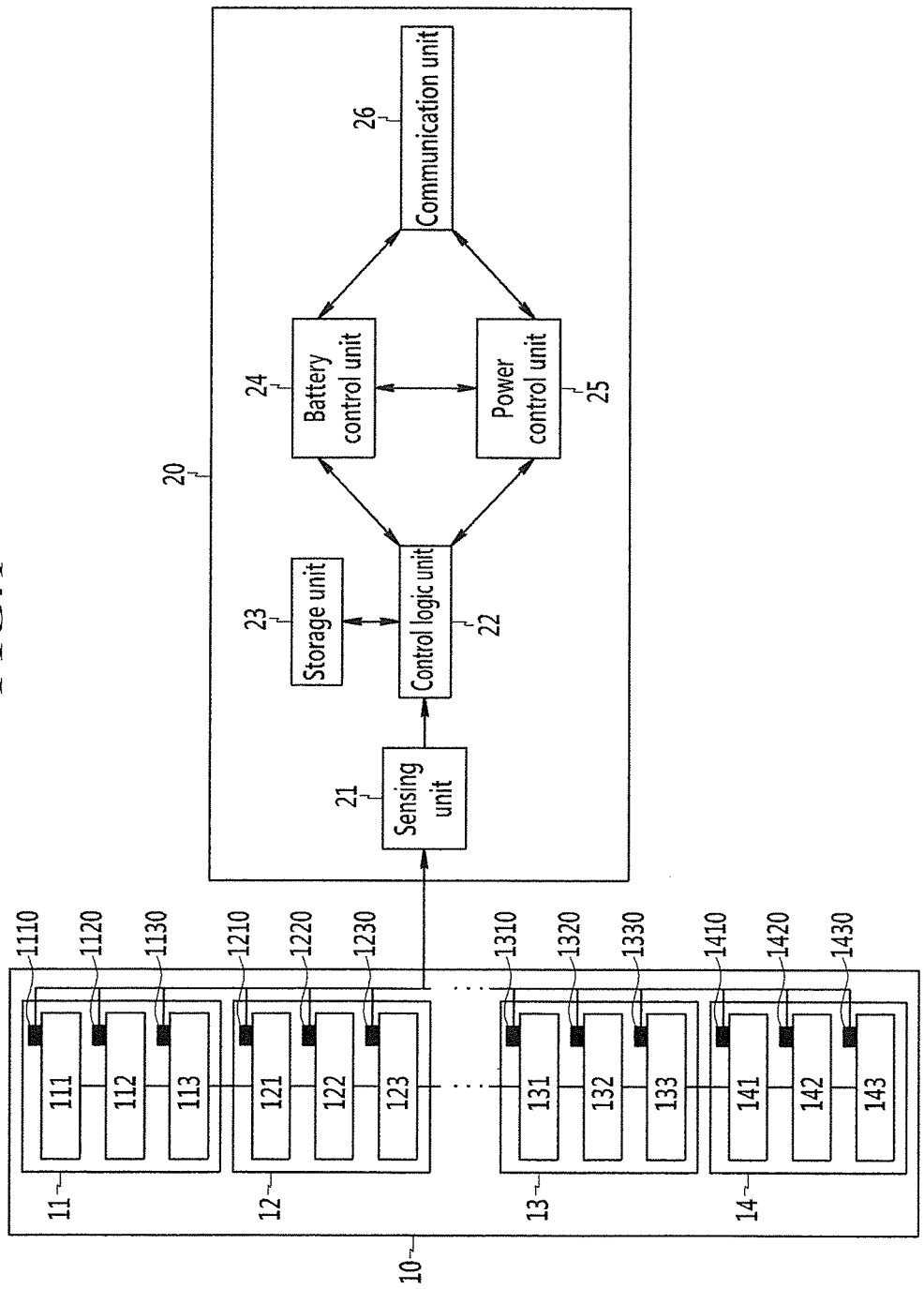
FIG. 1 is a block diagram of an apparatus for detecting a failure of a battery according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, the same constituent elements in exemplary embodiments are denoted by the same reference numerals and will be described representatively in a first exemplary embodiment, and only different configurations from the first exemplary embodiment will be described in the other exemplary embodiments.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

FIG. 1 is a block diagram of an apparatus for detecting a failure of a battery according to an exemplary embodiment of the present invention. Referring to FIG. 1, an apparatus 20 for detecting a failure of a battery is connected to a battery 10 to detect a failure of a battery cell in the battery 10, particularly, a mechanical defect.

The battery 10 includes a plurality of battery packs 11 to 14 (hereinafter, referred to as "packs") which are electrically connected to each other, and each of the plurality of packs 11 to 14 includes a plurality of unit battery cells which are electrically connected to each other. That is, a plurality of battery cells are electrically connected in all the plurality of packs in a manner where a plurality of battery cells 111 to 113 are electrically connected in a first pack, and a plurality of battery cells 121 to 123 are electrically connected in a second pack. In general, the plurality of battery cells are connected to each other in series.

FIG. 1 shows only four packs 11 to 14, but the number of the plurality of packs is not limited thereto. Further, FIG. 1 shows that a plurality of battery cells (e.g., 111 to 113) constituting each of the plurality of packs are electrically connected three by three, but is just one example of the connection of the plurality of battery cells included in the unit pack. Therefore, the present invention is not limited to the exemplary embodiment of FIG. 1.

Further, referring to FIG. 1, each of the plurality of battery cells included in each of the packs 11 to 14 of the battery 10 includes a cell internal pressure sensor. That is, a first cell internal pressure sensor 1110 is attached to the surface of a first battery cell 111 of the first pack 11, a second cell internal pressure sensor 1120 is attached to the surface of a second battery cell 112, and a third cell internal pressure sensor 1130 is attached to the surface of a third battery cell 113. In this manner, a cell internal pressure sensor is attached to the surface of each of the battery cells included in the other packs 12 to 14. The attachment of the cell internal pressure sensors to the surfaces of the battery cells is just one exemplary embodiment, but the present invention is not limited thereto. The cell internal pressure sensors may be attached in various ways.

According to the exemplary embodiment of FIG. 1, each of the plurality of cell internal pressure sensors is attached to the surface of the corresponding battery cell to measure internal pressure of the battery cell, generate a pressure signal including internal pressure information of the battery cell, and transmit the pressure signal to the apparatus 20 for detecting a failure of a battery. The plurality of cell internal pressure sensors detect internal pressure states of the battery cells in real time or intermittently for a set or predetermined period, thereby sensing the internal pressure states of the battery cells. The internal pressure of the battery cell may be increased or decreased due to a mechanical defect, an external environmental factor, overcharge or overdischarge, and it is possible to sense all the internal pressure states.

FIG. 1 shows that one cell internal pressure sensor generates and transmits a pressure signal regarding internal pressure information of the corresponding battery cell, but the cell internal pressure sensor is not limited thereto and may collect internal pressure signals of the plurality of battery cells included in the pack by the unit of pack to transmit internal pressure data of each of the plurality of battery cells to the apparatus 20 for detecting a failure of a battery.

For example, in FIG. 1, the first cell internal pressure sensor 1110 may acquire internal pressure data of the first battery cell 111 to transmit a pressure signal of the battery cell 111 to the apparatus 20 for detecting a failure of the battery 10, but the present invention is not limited thereto. Internal pressure data of the battery cells 111 to 113 included in the first pack 11, which is separately acquired by the first cell internal pressure sensor to the third cell internal pressure sensor 1110 to 1130, may be collected one at a time or concurrently and transmitted to the apparatus 20 for detecting a failure of the battery 10.

The cell internal pressure sensors 1110 to 1430 attached to the battery cells are devices for converting a level of pressure into an electrical signal, and a sensing method is not particularly limited. However, a capacitive pressure sensor or a pressure sensor using a strain gauge may be used. In one embodiment, a piezoelectric sensor may be used.

The pressure signal of each of the battery cells measured by the cell internal pressure sensors 1110 to 1430 is transmitted to a sensing unit 21 in the apparatus 20 for detecting a failure of the battery 10. That is, each of the cell internal pressure sensors 1110 to 1430 measures internal pressure of a corresponding one of the plurality of battery cells for a set or predetermined period intermittently or periodically, generates a pressure signal, and transmits the pressure signal to the sensing unit 21 for a period of time when each of the battery cells of the battery is charged or discharged. The internal pressure of the battery cells of the battery 10 is maintained at a pressure higher than the atmospheric pressure in a normal state. When a mechanical defect (e.g., leak) occurs, the internal pressure is gradually decreased to the level of the atmospheric pressure, in which a point where the cell internal pressure measured from the pressure signal is reduced below the atmospheric pressure is determined as a failed or abnormal state. As such, the mechanical defect (e.g., leak) of the individual battery cell may be detected early, and the corresponding battery cell which is determined as being in an abnormal state may be repaired and replaced early, thereby maintaining stability of charging and discharging of a battery system.

Here, referring to FIG. 1, the apparatus 20 for detecting a failure of the battery 10 includes a control logic unit 22, a storage unit 23, a battery control unit 24, a power control unit 25, and a communication unit 26 in addition to the sensing unit 21. However, constituent elements of the apparatus 20 for detecting a failure of a battery shown in FIG. 1 are not limited thereto.

The sensing unit 21 receives a plurality of input signals, which include information regarding internal pressure of each of the plurality of battery cells, to read internal pressure data of each of the plurality of battery cells. The sensing unit 21 of the apparatus 20 for detecting a failure of the battery 10 shown in FIG. 1 is a device capable of detecting various causes of the failure of the battery 10, particularly, a mechanical defect (e.g., leak), and receives the pressure signal measured by the cell internal pressure sensors 1110 to 1430, but the sensing unit 21 may also measure a factor of other causes of the failure and receive the corresponding information. For example, the sensing unit 21 may receive information such as a cell temperature, a battery ambient temperature, humidity, a charging amount, a cell voltage, a charging and discharging current, and a battery pack voltage among various factors which may influence the deterioration of the battery 10. Hereinafter, all factors including the factors of detecting the mechanical defect and the factors of influencing the deterioration of the battery 10 are referred to as battery failure determining factors.

The measurement information of the failure determining factors acquired by the sensing unit 21 is transmitted to the control logic unit 22.

The control logic unit 22 generates operating patterns in a normal state during the period of time of charging or discharging of the battery 10 in advance according to the failure determining factors such a cell temperature, a battery ambient temperature, humidity, a charging amount, a cell voltage, a charging and discharging current, and a battery pack voltage.

Further, the control logic unit 22 sets a normal range in which the battery system can be stably driven or operated for each failure determining factor other than the patterns of the normal state. In this case, after acquiring information on an external driving state based on a communication signal transmitted through the communication unit 26, the control logic unit 22 may set the normal range depending on the acquired information. That is, since the normal range recognized as the normal state may be changed according to the failure determining factors such as temperature, humidity, a charging amount, a cell voltage, a pack voltage, and cell internal pressure depending on a driving operation of a system, mechanism or apparatus mounted with the battery system, the control logic unit 22 may receive the communication signal to acquire driving status information of the system or the apparatus mounted with the battery through a management system of the battery (for example, BMS) in advance, and may obtain set values of the normal ranges for each failure determining factor.

Thereafter, the control logic unit 22 receives sensing information according to the failure determining factors which is acquired in real time or intermittently for a set or predetermined period from the sensing unit 21. The control logic unit 22 compares the sensing information according to the failure determining factors which is acquired in real time or intermittently for a set or predetermined sensing period, with the set or predetermined patterns of the normal state. When the sensing information is out of the normal ranges according to the failure determining factors, the state of the battery 10 is determined to be in an abnormal or erroneous state, and as a result, the corresponding failed cell is detected.

Specifically, in an exemplary embodiment of the present invention, the control logic unit 22 generates normal patterns corresponding to charging and discharging periods according to characteristics of unit battery cells constituting the battery 10 in advance and sets normal ranges of internal pressure of the battery cells.

The control logic unit 22 acquires internal pressure data of each of the plurality of battery cells based on the pressure signals which are measured by the internal pressure sensors of the battery cells in real time when the battery 10 is operated by charging and discharging, or for a set or predetermined sensing period intermittently or periodically, and transmitted to the sensing unit 21. The control logic unit 22 compares the patterns of the acquired internal pressure data with the normal patterns of the battery cell internal pressure. As a result, when it is detected that the cell internal pressure is reduced to be out of the normal range of the cell internal pressure in one or more battery cells included in the battery 10, the corresponding battery cell is determined as a failed cell.

In the process, the storage unit 23 is connected to the control logic unit 22 and stores various information measured for each battery failure determining factor. Particularly, measured internal pressure data of each of the battery cells of the battery 10 is stored.

The storage unit 23 is linked with the control logic unit 22 to store the set values of the normal range in which the battery 10 may be in the normal state and the patterns of the normal states according to the failure determining factors depending on the charging or discharging period. In this case, the set values of the normal range may be set as an upper limit and a lower limit for each failure determining factor, in which the outermost range recognized as the normal range may be set and stored.

Further, the storage unit 23 may store indicators relating to charge and discharge such as a current state of charge (SOC) or state of health (SOH) of each of the battery cells in the battery system. The storage unit 23 may store the measurement information according to the failure determining factors measured in real time or intermittently for a set or predetermined period, and resultant cumulative information, charge and discharge related information of the battery pack, reset information of the pack voltage, and the like.

In one embodiment, the storage unit 23 is a non-volatile storage device which is electrically writable and erasable and may be an EEPROM, but is not limited thereto.

When the battery cells constituting the battery pack included in the battery 10 are the same, it may be assumed that the ranges of the normal states for each failure determining factor are the same for every battery cell.

Here, the battery control unit 24 and the power control unit 25 are linked with each other, and linked with the control logic unit 22 and the communication unit 26.

The battery control unit 24 acquires information on the battery cell of the battery 10 which is determined as being in a failed or abnormal state by the logic control unit 22, and controls charging and discharging or driving of the battery 10. Further, the battery control unit 24 is linked with the power control unit 25 to set a battery power supply in a safe mode and controls an operation of the battery system so as to repair, replace, or remove the failed cell detected in the battery 10.

Specifically, the battery control unit 24 determines the number and positions of the failed cells and the like in the plurality of packs of the battery 10, and interrupts the electrical connection for the corresponding pack of the battery 10 including the failed cells to partially stop operating the battery 10. Alternatively, as a result of determining information of the failed cell, when the information exceeds a threshold level of operation, that is, the number of the failed cells exceeds a set or predetermined threshold level of operation, the operation of the entire battery 10 including the failed cells may be stopped.

When the battery control unit 24 controls the battery pack including the failed cell to be partially operated, the battery control unit 24 ascertains the state of charge (SOC) of the other normal battery packs or normal battery cells and controls charging or discharging of the other battery packs.

In addition, when the failed cell is detected and determined as the failed cell by the control logic unit 22, a mechanical defect of the corresponding failed cell is ascertained to repair or replace the failed cell. After repairing or replacing the failed cell, the battery control unit 24 may perform cell balancing so as to balance the SOC of the repaired battery cell with SOCs of the other battery cells. Cell balancing is a process of discharging cells having comparatively high SOCs and charging cells having comparatively low SOCs. Charge balance among the cells may be maintained by performing the cell balancing for replaced or repaired battery cells in a failed cell area.

Here, the power control unit 25 is connected to the control logic unit 22 to control auxiliary power supply depending on failure state determination of the control logic unit 22. When the control logic unit 22 detects the failed cell and the battery control unit 24 controls driving of the battery 10 so as to repair or replace the corresponding failed cell, the power control unit 25 supplies supplemental power to an external system to which the battery 10 supplies power, using an auxiliary battery. Further, the power control unit 25 may supply power so that power is not interrupted inside the apparatus 20 for detecting a failure of the battery 10.

Even when a serious failure occurs in the battery 10 and the battery 10 is temporarily being repaired, the power control unit 25 can stably supply power to the external system without interrupting power supply.

The communication unit 26 performs communication between internal components of the apparatus 20 for detecting a failure of a battery or communication between the apparatus 20 for detecting a failure of a battery and the external system. Although not shown in FIG. 1 in detail, when the information acquired from the cell internal pressure sensors of the battery cells in the pack of the battery 10 is transmitted to the sensing unit 21 using wireless communication, communication between the cell internal pressure sensors and the apparatus 20 for detecting a failure of a battery may be performed.

It is possible to ascertain state information on the failed cell that is detected by the apparatus 20 for detecting a failure of a battery or information on the battery state remotely from the external system through the communication unit 26. On the contrary, it is possible to transmit commands regarding battery control to the apparatus 20 for detecting a failure of the battery 10 through the communication unit 26 to remotely adjust the apparatus 20 for detecting a failure of the battery 10.

Figure 2:
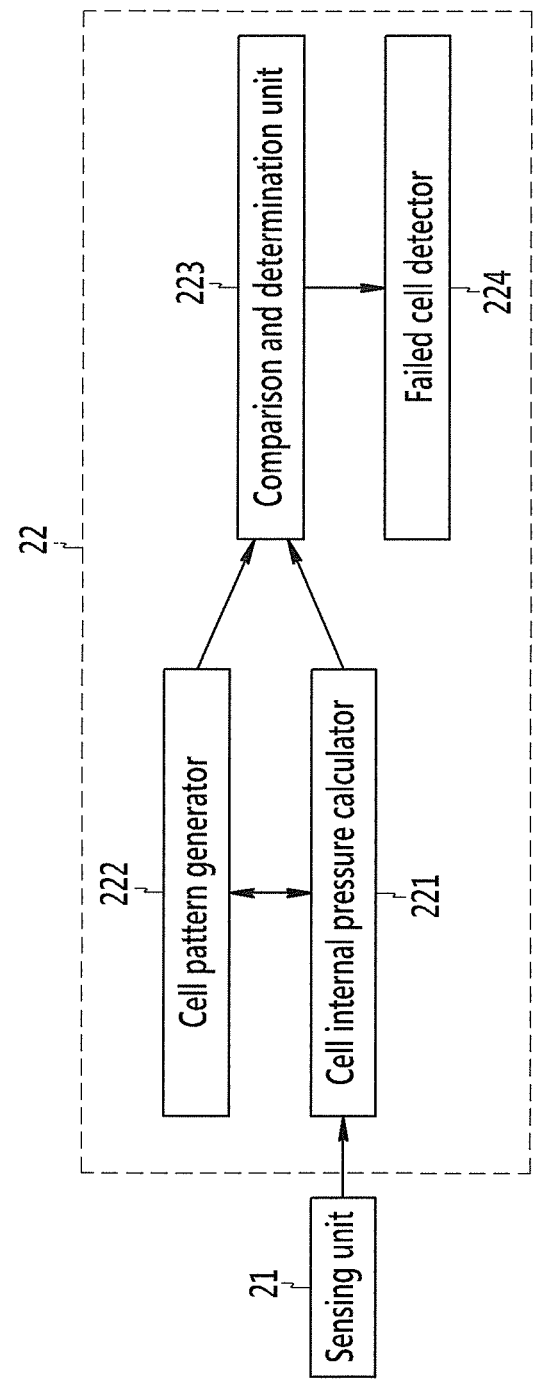
FIG. 2 is a detailed view of a control logic unit 22 of the apparatus for detecting a failure of a battery shown in FIG. 1.

FIG. 2 is a block diagram illustrating a detailed configuration of the control logic unit 22 of the apparatus 20 for detecting a failure of the battery 10 shown in FIG. 1.

FIG. 2 shows the control logic unit 22 for detecting a failed cell based on internal pressure of a battery cell in accordance with failure determining factors. The control logic unit 22 includes a cell internal pressure calculator 221, a cell pattern generator 222, a comparison and determination unit 223, and a failed cell detector 224.

The cell internal pressure calculator 221 calculates battery cell internal pressure from a pressure signal of each of the plurality of battery cells in the battery pack acquired from the sensing unit 21.

The cell pattern generator 222 generates patterns of internal pressure of each of the cells from the internal pressure data of each of the plurality of battery cells in the battery pack which is previously acquired for a period of time when the battery 10 is normally charged and discharged.

Therefore, the cell pattern generator 222 is continuously connected to the cell internal pressure calculator 221 to generate or update normal patterns of the internal pressure of the plurality of battery cells calculated by the cell internal pressure calculator 221. The normal patterns of the internal pressure may be generated differently according to other failure determining factors or internal and external environmental variables. The cell pattern generator 222 may additionally set a normal range of cell internal pressure in advance from the normal patterns of the internal pressure of the battery cells.

The comparison and determination unit 223 is connected to the cell internal pressure calculator 221 and the cell pattern generator 222 to compare internal pressure pattern information of the normal state generated by the cell pattern generator 222 with the internal pressure data of each of the plurality of battery cells in the battery 10 calculated in real time or periodically by the cell internal pressure calculator 221, and determine whether a failed cell exists. That is, the comparison and determination unit 223 compares the internal pressure patterns of the normal state with the internal pressure data detected in real time or periodically, and determines a battery cell having internal pressure out of the set or predetermined normal range of the cell internal pressure as a failed cell. The failed cell detector 224 acquires information on the failed cell that is detected from the comparison and determination unit 223 and ascertains information such as positions and the number of the failed cells. The comparison and determination unit 223 and the failed cell detector 224 shown in FIG. 2 may be integrated together instead of being separately provided.

When a mechanical defect (e.g., leak) occurs in a battery cell, the cell internal pressure is reduced below the normal range. The battery cell of which the cell internal pressure is reduced out of the normal range is determined as a failed cell in which the leak occurs. That is, when the mechanical defect occurs in the battery cell, cell internal pressure of the battery cell maintaining higher internal pressure than the atmospheric pressure is reduced to the same level as or below the atmospheric pressure, and the battery cell is determined as the failed cell.

A process of detecting a failure of a battery cell due to a change in internal pressure caused by a mechanical defect (e.g., leak) among the failure determining factors according to an exemplary embodiment of the present invention is described with reference to the graphs of FIGS. 3 to 5.

Figure 3:
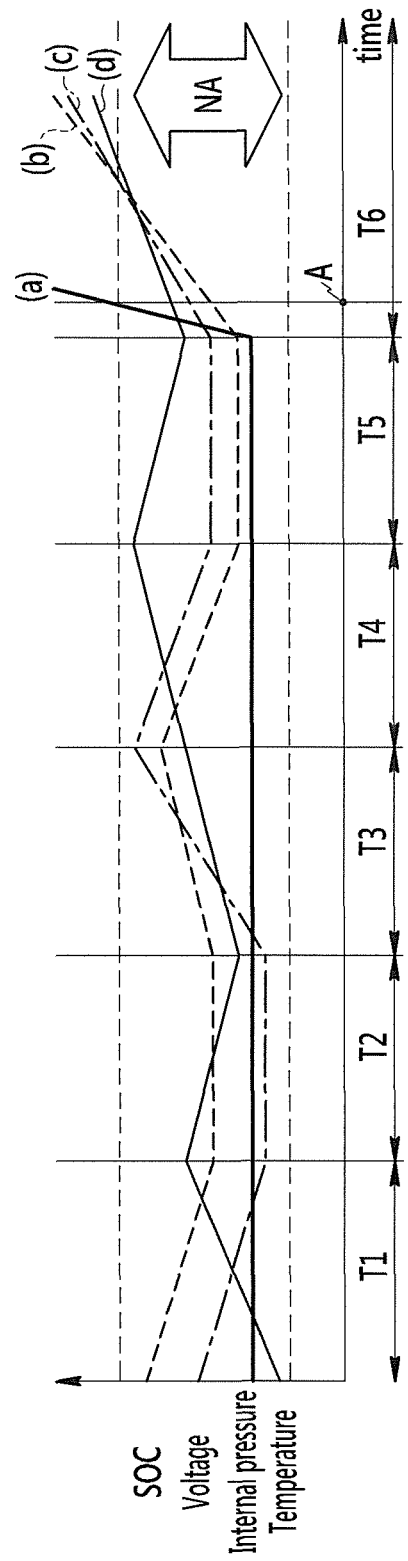
FIG. 3 is a graph illustrating patterns for detecting a failure of a battery in a normal state.

FIG. 3 illustrates patterns for detecting a failure of a battery due to other causes when the battery is in a normal state with respect to a mechanical defect. FIGS. 4 and 5 illustrate patterns for detecting a failure of a battery according to an existing method and patterns for detecting a failure of a battery according to an exemplary embodiment of the present invention when the battery is in abnormal state due to a mechanical defect, respectively. In describing the graphs of FIGS. 3 to 5, a normal state corresponds to a case where the battery is not failed and a case where the failure of the battery is not caused by a mechanical defect (e.g., leak).

First, FIG. 3 is a graph illustrating patterns for detecting a failure of a battery in a normal state.

Figure 4:
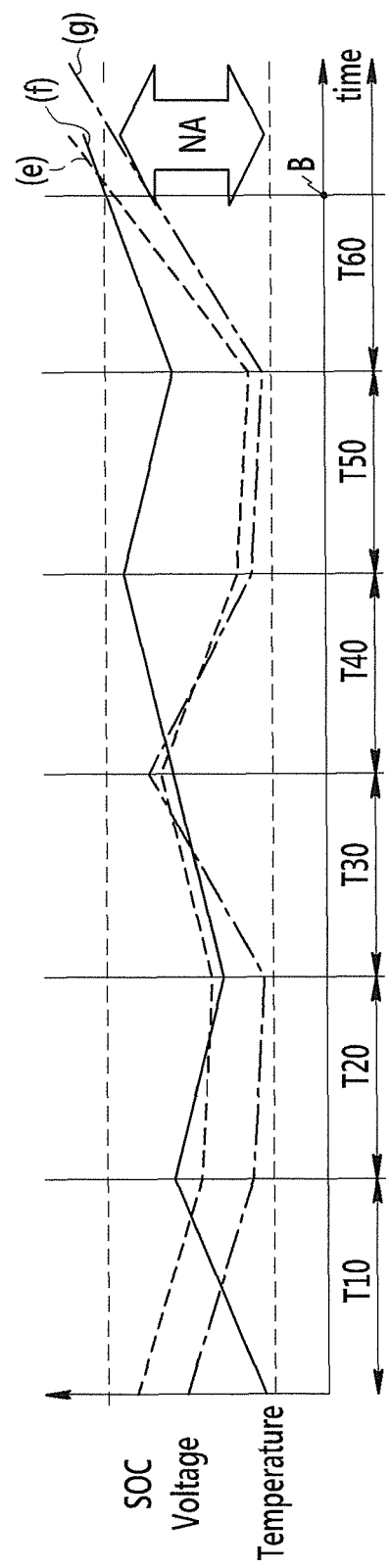
FIG. 4 is a graph illustrating patterns for detecting a failure of a battery of the related art in an abnormal state where the battery has a mechanical defect.
Figure 5:
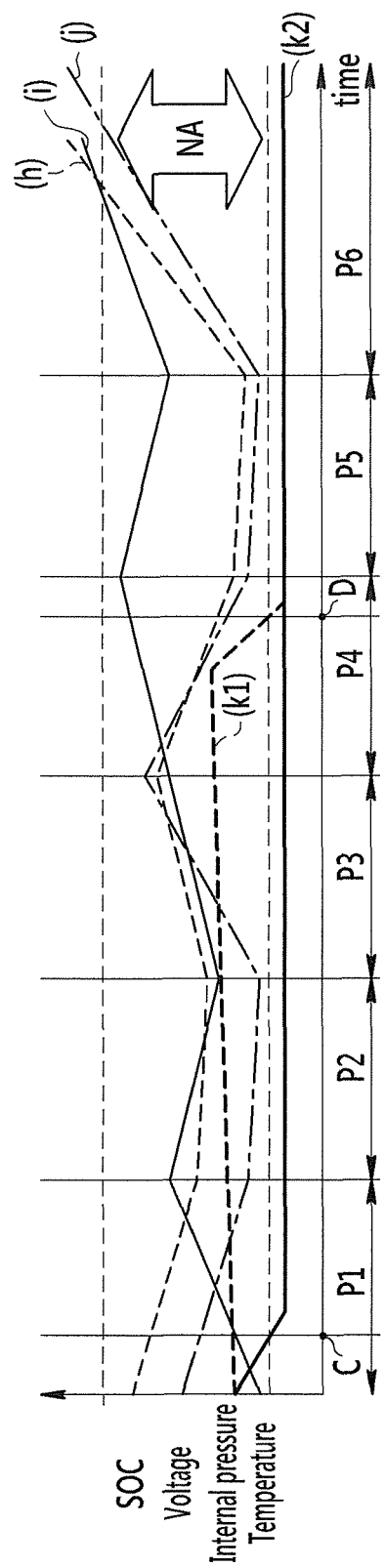
FIG. 5 is a graph illustrating patterns for detecting a failure of a battery according to a method for detecting a failure of a battery according to an exemplary embodiment of the present invention in an abnormal state where the battery has a mechanical defect.

Horizontal axes in the graphs of FIGS. 3 to 5 correspond to time indicating a series of charging or discharging processes.

Further, vertical axes in the graphs of FIGS. 3 and 5 correspond to SOC, voltage, internal pressure (cell internal pressure), and temperature, which are representative among battery failure determining factors, and a vertical axis in the graph of FIG. 4 corresponds to the SOC, the voltage, and the temperature excluding the internal pressure.

The time axes (horizontal axes) of FIGS. 3 to 5 are divided into 6 sections of T1 to T6, in which in the case of the battery being used for a vehicle, the T1 section may be a discharging section of the battery corresponding to the vehicle being driven, the T2 section may be an idling section where the vehicle is stopped, the T3 section may be a charging section where consumed power of the battery is replenished, the T4 section may be another discharging section corresponding to the vehicle being driven again, and the T5 section may be another idling section. Further, the T6 section may be an overcharging section where the SOC of the battery is out of the normal range, and the battery is excessively charged.

Even though normal ranges are different for each failure determining factor as shown in the graphs of FIGS. 3 to 5, for convenience of description, a normal range NA is represented by one area for all the failure determining factors.

Referring to FIG. 3, when the battery is in the normal state where the failure of the battery is not caused by the mechanical defect (e.g., leak), a normal pattern (a) of the cell internal pressure is uniformly maintained within the normal range in all the sections. In this case, the normal range may be higher than the atmospheric pressure.

It can be seen that a pattern (b) illustrating an SOC of the battery is gradually decreased within the normal range in the discharging sections of the T1 and T4 sections, maintains a uniform level in the idling sections of the T2 and T5 sections, and is gradually increased within the normal range in the charging section of the T3 section. Thereafter, the SOC pattern (b) of the battery reaches the overcharge state out of an upper limit of the normal range in the T6 section.

It can be seen that a pattern (c) illustrating the voltage of the battery is similar to the pattern (b) illustrating the SOC of the battery. That is, the pattern (c) is gradually decreased within the normal range in the T1 and T4 sections, maintains equilibrium (or remains substantially constant) in the T2 and T5 sections, is gradually increased within the normal range in the T3 section, and is increased out of the normal range in the T6 section in the overcharge state.

It can be seen that a temperature pattern (d) of the battery is increased within the normal range in the discharging and charging sections of the T1, T3 and T4 sections and gradually decreased in the idling sections of the T2 and T5 sections. However, the temperature pattern (d) is sharply increased in the overcharging section of T6 and gets out of the normal range.

In the case of the normal state as shown in FIG. 3, the internal pressure pattern (a) of the battery maintains the uniform level within the normal range because there is no mechanical defect during the period of time of discharging, idling, and charging of the T1 to T5 sections, that is, in the case of a vehicle, while the vehicle is driving, stopped, and charged. Then, when a chemical reaction of the battery cell becomes excessive due to overcharge, the internal pressure pattern (a) sharply gets out of the normal range, compared with any other failure determining factors in the T6 section, and the internal pressure is increased. Therefore, it is possible to detect the failure of the battery due to the overcharge at point A of the T6 section where the internal pattern (a) gets out of the normal range NA due to the overcharge. However, since the other failure determining factors (SOC, voltage, temperature) other than the cell internal pressure information also get out of the normal range NA in the T6 section in the overcharge state similarly as the cell internal pressure, it is possible to detect the failure due to the overcharge of the battery system without a large difference in time.

FIG. 4 illustrates patterns for detecting a failure when a mechanical defect (e.g., leak) occurs in a battery cell under the same condition as in FIG. 3, and particularly, FIG. 4 shows a case where the internal pressure pattern among the failure determining factors is not obtained.

Referring to FIG. 4, it can be seen that a leak in the battery cell cannot be easily detected when the time is divided into T10 to T60 sections corresponding to the T1 to T6 sections of FIG. 3. That is, even though a mechanical defect (e.g., leak) occurs in a part of the battery cell in the battery, the patterns of all the failure determining factors are not noticeably different from the patterns of FIG. 3 in the normal state. When a SOC pattern (e), a temperature pattern (f), and a voltage pattern (g) all exceed the normal range NA in the T60 section as an overcharging section, the failure can be detected. Particularly, in the T60 section, it is possible to detect the failure of the battery first at point B when the temperature pattern (f) exceeds the normal range NA first. Therefore, this is nothing but detection of the abnormality of the battery due to the overcharge as shown in FIG. 3, and it is not possible to detect the failure of the battery due to a mechanical defect of an individual battery cell by the SOC pattern (e), the temperature pattern (f), the voltage pattern (g).

That is, since it is not possible to detect early the failure at a point of time when the mechanical defect of the individual battery cell occurs by using only the failure determining factors such as the SOC, the temperature, and the voltage, it is not possible to ensure stability of the battery system in the existing method as shown in FIG. 4. Particularly, because the mechanical defect (e.g., leak) of the battery cell may cause the failure of the entire battery due to a reaction of leaking chemical materials and may cause much damage, it is desirable to rapidly diagnose and detect the mechanical defect at an early stage. Therefore, the battery cell having the mechanical defect should be detected early by including a cell internal pressure pattern in the battery failure determining factors of the battery as shown in FIG. 5 according to an exemplary embodiment of the present invention.

Referring to FIG. 5, the time of a horizontal axis is divided into P1 to P6 sections which are the same as the time divisions of FIGS. 3 and 4, and internal pressure patterns (k1) and (k2) are further added by acquiring cell internal pressure information.

Particularly, the first internal pressure pattern (k1) shows an internal pressure pattern for a battery including battery cells designed to have durability for a mechanical defect, and the second internal pressure pattern (k2) shows an internal pressure pattern of a case where an initial leak occurs in a battery including general battery cells which is not designed to have mechanical durability.

As reviewed in the graphs of FIGS. 3 and 4, it is possible to detect a failure of the battery when one or more of an SOC pattern (h), a temperature pattern (i), and a voltage pattern (j) get out of the normal range NA in the overcharging section of P6. However, the first internal pressure pattern (k1) can maintain a uniform internal pressure within the normal range NA of the internal pressure for a set or predetermined time due to the durability design even though the mechanical defect occurs, and it is possible to detect the failure of the battery cell when the first internal pressure pattern (k1) is reduced below the lower limit of the internal pressure level in the normal range NA at point D. Therefore, it is possible to rapidly determine the mechanical defect of the battery cell in the battery, which is difficult to be detected by other failure determining factors.

Further, in the case of the battery cell which is not designed to have the durability, because the internal pressure of the battery cell is reduced below the lower limit of the internal pressure level within the normal range NA at initial point C of the P1 section as shown by the second internal pressure pattern k2, it is possible to immediately detect the failed cell due to the mechanical defect compared with the SOC pattern (h), the temperature pattern (i), the voltage pattern (j).

Figure 6:
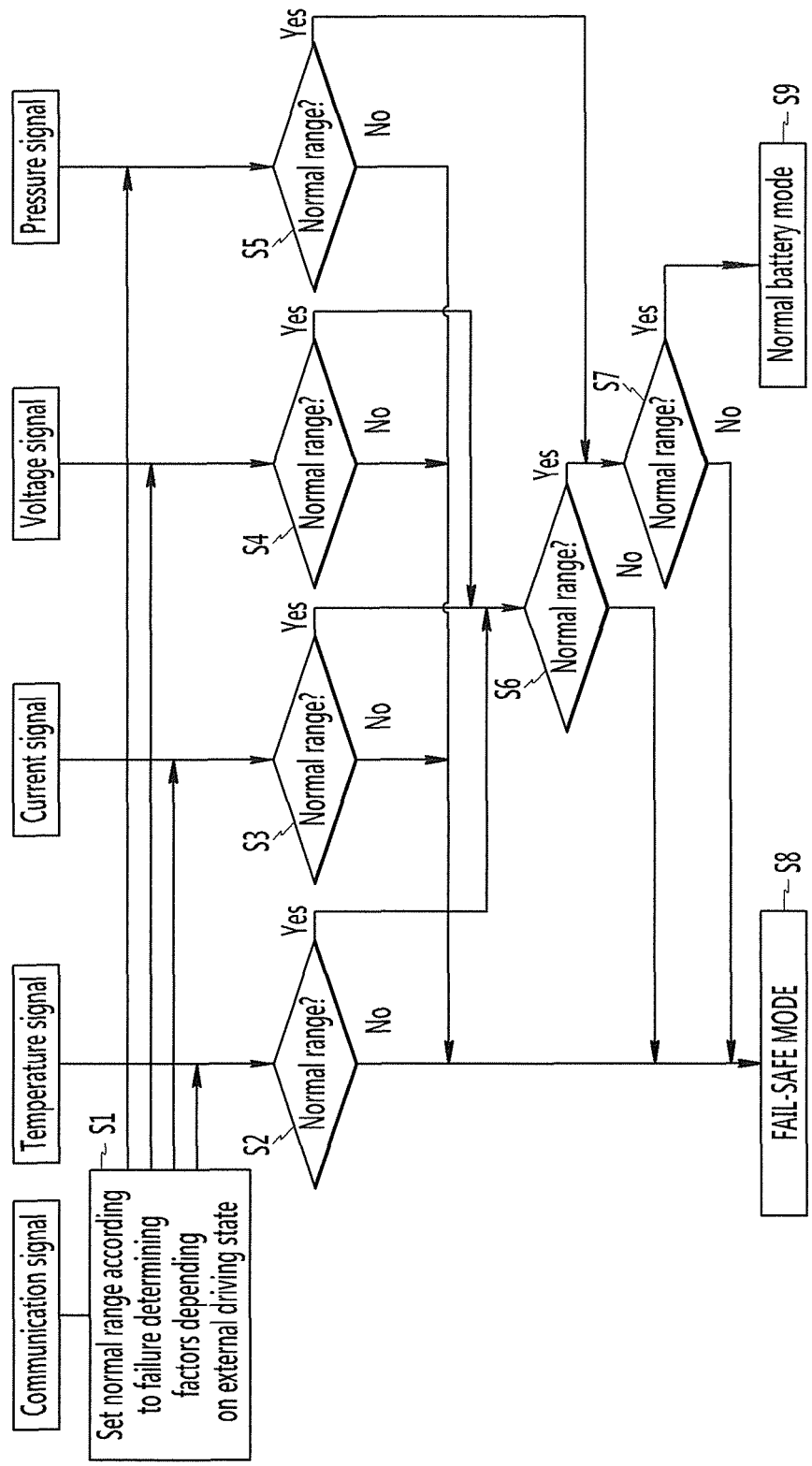
FIG. 6 is a logic diagram of determining a failure of a battery in the method for detecting a failure of a battery according to an exemplary embodiment of the present invention.

FIG. 6 is a logic diagram for determining a failure of a battery in a method for detecting a failure of a battery according to an exemplary embodiment of the present invention. That is, FIG. 6 shows a flow chart in which the control logic unit 22 of the apparatus 20 for detecting a failure of a battery of the present invention ascertains states of the failure determining factors of the battery from each of the input (detection) signals for detecting the SOC, voltage, internal pressure (cell internal pressure), and temperature, which are representative among the battery failure determining factors, and determines the failure of the battery.

Referring to FIG. 6, first, the control logic unit 22 determines set values of normal ranges for each battery failure determining factor (S1). As described above, the respective normal ranges are set for each corresponding factor depending on the external driving state after receiving the communication signal through the communication unit 26 and acquiring the information on the driving state of the system or the apparatus employing the battery system.

For example, when the battery system is employed in the vehicle, it is possible to acquire the information on a driving state of the vehicle at a point of time when the failure of the battery is determined, that is, a behavior state of the vehicle such as driving, stop, and parking as the divided sections in FIGS. 3 to 5. The information on the behavior state of the vehicle is acquired by the communication signal through a battery management system or an external system. Then, a section among discharging, idling, charging, and overcharging corresponding to an operation state of the battery is determined according to the behavior state of the vehicle and correspondingly, the normal range values are differently calculated according to the failure determining factors of the battery. Then, the set values of the normal ranges according to the battery failure determining factors set in step S1 are applied to a process for determining the failure for each factor.

Herein, the communication signal transmitted through the communication unit 26 is not particularly limited, but may be a controller area network (CAN) communication signal using CAN.

In the exemplary embodiment of FIG. 6, an input signal for detecting a battery state according to the battery failure determining factors may include a temperature signal, a current signal indicating an SOC, a voltage signal, and a pressure signal regarding the internal pressure of the battery cell in the battery, but is not necessarily limited thereto.

Although not shown in the logic diagram of FIG. 6, the input signals including the detection information of the failure determining factors are calculated as values indicating the states of the battery cells in the battery for each battery failure determining factor by the control logic unit 22. Further, the normal ranges which are set depending on the external driving state in step S1 are compared with the result values calculated through the current input signals.

It is determined whether a temperature result value of the battery cell detected through the temperature signal is within the normal range of the temperature of the battery cell of the battery in view of the normal state patterns of the temperature in step S2.

It is determined whether the SOC result value of the battery cell detected through the current signal is within the normal range of the SOC in view of the normal state patterns of the SOC of the battery cell in step S3.

It is determined whether the voltage result value of the battery cell detected through the voltage signal of the battery cell is within the normal range of the voltage of the battery cell of the battery in view of the normal state patterns of the voltage in step S4.

Finally, it is determined whether the internal pressure result value of the battery cell detected through the pressure signal including internal pressure data of the battery cell is within the normal range of the internal pressure of the battery cell of the battery in view of the normal state patterns of the cell internal pressure in step S5.

If any one of the failure determining factors of the temperature, the SOC, the voltage, and the cell internal pressure in the current battery cell state is not within the normal ranges in steps S2 to S5, the battery system determines that the battery cell is in the failed state and enters a fail-safe mode. A subsequent work of replacing or repairing the corresponding cells determined as being in the failed state in the fail-safe mode may be performed, or the operation of the entire battery system may be stopped depending on the seriousness of the failed state.

Steps S2 to S5 may be performed sequentially or concurrently (e.g., simultaneously). Further, it is not necessary to perform all the steps S2 to S5, and some of the steps may be omitted or other steps may be added depending on the input signals transmitted to the sensing unit. The apparatus for detecting a failure of a battery of the present invention can diagnose early the failed cell due to the mechanical defect in the battery system by detecting the internal pressure states of the battery cells of the battery, for example in step S5, where the leak of the battery cell may be determined.

According to an exemplary embodiment of the present invention, when all the current states of the failure determining factors are within the normal ranges according to the respective input and output signals in steps S2 to S5, it is possible to maintain a normal operation mode of the battery. That is, the process may proceed to step S9.

However, in some cases, due to an erroneous operation of a sensor for measuring information on the failure determining factors in the battery cells in the battery, for example, a cell internal pressure sensor for measuring the cell internal pressure information, the battery may be determined as being within the normal ranges even though the battery is in the abnormal state. Therefore, a process of determining whether the sensor is normal may further be performed in order to improve accuracy in determining the failure of the battery.

Referring to FIG. 6, when the temperature, the SOC, and the voltage of the battery cell of the battery are determined as being within the normal ranges in steps S2 to S4, respectively, whether the respective states of the failure determining factors are within the normal ranges are determined again in step S6. When any one of the temperature, the SOC, and the voltage of the battery cell of the battery is not within the normal range, the battery is determined as being in the failed state and enters a fail-safe mode in step S8. When all the current states of the temperature, the SOC, and the voltage of the battery cell of the battery are within the normal range in step S6, the current state information of the internal pressure of the battery cell is received in step S5, and it is determined once again whether the states of the failure determining factors of each of the battery cell of the battery are within the normal ranges at a time in step S7. In this case, when any one of the current state information of the temperature, the SOC, the voltage, and the cell internal pressure of the battery cell of the battery is out of the normal range, the battery is determined as being in the failed state and enters a fail-safe mode in step S8 to control the operation of the battery such that repairing or replacing the corresponding failed cell can be performed. On the other hand, in step S7, when all the current state information of the temperature, the SOC, the voltage, and the cell internal pressure is within the normal range, the battery is determined as being in the normal state and enters step S9 to operate in a normal battery driving mode.

Steps S6 and S7 of determining the failure of the battery are added to prevent or reduce errors of determination due to an erroneous operation of the sensor battery, and the number of the determination processes added according to the battery state, the environment, and the degree of deterioration is not limited.

The drawings and detailed description herein are to be construed as merely illustrative and not a limitation of the scope of the present invention as seen in the appended claims. Further, a person of ordinary skill in the art may remove a part of the constituent elements described in the specification without deterioration of performance, or add constituent elements to improve performance. In addition, a person of ordinary skill in the art may change the order of the steps of the method described in the specification depending on process environment or equipment. Therefore, it is intended that the scope of the invention be defined by the claims appended hereto and their equivalents.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME REFERENCE NUMERALS

10: Battery
20: Apparatus for detecting a failure of a battery
22: Control logic unit
24: Battery control unit
26: Communication unit
111, 112, 113, 121, 122, 123, 131, 132, 133, 141, 142, 143: Battery cell
11, 12, 13, 14: Battery pack
21: Sensing unit
23: Storage unit
25: Power control unit

| | |
|---|---|
| 221: Cell internal pressure calculator | 222: Cell pattern generator |
| 223: Comparison and determination unit | 224: Failed cell detector |
| 1110, 1120, 1130, 1210, 1220, 1230, 1310, 1320, 1330, 1410, 1420, 1430: Cell internal pressure sensor | |

What is claimed is:

1. An apparatus for detecting a failure of a battery, comprising:
a plurality of cell internal pressure sensors, each provided in a corresponding one of a plurality of battery cells included in a battery, the cell internal pressure sensors each being configured to measure internal pressure of a corresponding one of the plurality of battery cells and generate and transmit pressure signals including internal pressure data corresponding to the measured internal pressure;
a sensing unit configured to receive the pressure signals from the plurality of cell internal pressure sensors to sense the internal pressure of each of the plurality of battery cells and configured to sense a cell voltage and a cell temperature of each of the plurality of battery cells; and
a control logic unit configured to receive the internal pressure data, the cell voltage, and the cell temperature of each of the plurality of battery cells sensed by the sensing unit and determine whether or not a battery cell from among the plurality of battery cells is a failed cell,
wherein, the control logic unit is configured to determine a corresponding battery cell from among the plurality of battery cells as the failed cell having a mechanical defect when the internal pressure of the corresponding battery cell is below a lower limit of a normal range, and when the cell voltage and the cell temperature of the corresponding battery cell are respectively in normal ranges, and
wherein the lower limit is atmospheric pressure and the mechanical defect is a leak.

2. The apparatus for detecting a failure of a battery of claim 1, wherein:
the control logic unit is configured to generate patterns of normal states for the internal pressure of the battery cells corresponding to a charging or discharging period of the battery cells in advance, and set a normal range of the internal pressure of the battery cells.

3. The apparatus for detecting a failure of a battery of claim 1, wherein:
when the internal pressure data is increased above an upper limit of the normal range of the internal pressure of the battery cells, the control logic unit is configured to determine a corresponding battery cell from among the plurality of battery cells having the internal pressure above the upper limit of the normal range as an overcharged cell.

4. The apparatus for detecting a failure of a battery of claim 1, wherein:
the cell internal pressure sensor is configured to measure the internal pressure of each of the plurality of battery cells in real time or intermittently.

5. The apparatus for detecting a failure of a battery of claim 1, wherein:
the cell internal pressure sensor comprises a piezoelectric sensor, a capacitive pressure sensor, or a strain gauge.

6. The apparatus for detecting a failure of a battery of claim 1, wherein:
the sensing unit is further configured to sense information on one or more battery failure determining factors of each of the plurality of battery cells, comprising a battery ambient temperature, humidity, a charging amount, a charging current, a discharging current, and a battery pack voltage.

7. The apparatus for detecting a failure of a battery of claim 1, further comprising:
a storage unit coupled with the control logic unit and configured to store the internal pressure data of each of the plurality of battery cells, patterns of normal states for the internal pressure of the battery cells corresponding to a charging or discharging period of the battery, a set value of the normal range of the internal pressure of the battery cells, information on a battery failure determining factor which is further sensed by the sensing unit, and information on a current state of charge (SOC) or state of health (SOH) of the battery.

8. A method for detecting a failure of a battery, comprising:
generating cell internal pressure patterns, cell voltage patterns, and cell temperature patterns of normal states by measuring internal pressures, cell voltages, and cell temperatures of a plurality of battery cells included in the battery for a period of time when the battery is normally charged and discharged;
setting normal ranges of the internal pressures, the cell voltages, and the cell temperatures of the battery cells respectively according to the cell internal pressure patterns, the cell voltage patterns, and the cell temperature patterns of the normal states;
receiving internal pressure data of each of the plurality of battery cells from a cell internal pressure sensor, cell voltage data from a voltage sensor, and cell temperature data from a temperature sensor;
comparing the internal pressure data with the cell internal pressure patterns of the normal state, and determining whether the internal pressure is below a lower limit of the normal range of the internal pressure of the battery cell;
comparing the cell voltage data with the cell voltage patterns of the normal state and the cell temperature data with the cell temperature patterns of the normal state, and determining whether the cell voltage and the cell temperature are respectively in the normal ranges; and
determining a corresponding battery cell from among the plurality of battery cells of which the internal pressure is below the lower limit of the normal range of the internal pressure of the battery cell and the cell voltage and the cell temperature are respectively in the normal ranges as a failed cell having a mechanical defect,
wherein the lower limit is atmospheric pressure and the mechanical defect is a leak.

9. The method for detecting a failure of a battery of claim 8, further comprising:
controlling charging or discharging of the other battery cells of the battery except for the failed cell while the failed cell is repaired or replaced.

10. The method for detecting a failure of a battery of claim 8, wherein:
- when the internal pressure data of each of the plurality of battery cells is increased above an upper limit of the normal range of the internal pressure of the battery cell, a corresponding battery cell from among the plurality of battery cells is determined as an overcharged cell.

11. The method for detecting a failure of a battery of claim 8, wherein:
- the internal pressure of each of the plurality of battery cells is measured in real time or intermittently.

12. The apparatus for detecting a failure of a battery of claim 1, further comprising:
- a battery control unit configured to control charging or discharging of the other battery cells from among the battery cells of the battery except for the failed cell while the failed cell is repaired or replaced.

13. The apparatus for detecting a failure of a battery of claim 12, further comprising:
- a power control unit configured to assist in supplying power to an external power system coupled to the battery in response to the determination of the failed cell by the control logic unit.

14. The apparatus for detecting a failure of a battery of claim 13, further comprising:
- a communication unit coupled to the battery control unit and the power control unit and configured to perform internal communication within the apparatus for detecting a failure of the battery or perform communication between the apparatus for detecting a failure of the battery and an external system coupled to the battery.

* * * * *